United States Patent
Monz et al.

(10) Patent No.: US 10,365,148 B2
(45) Date of Patent: Jul. 30, 2019

(54) METHOD FOR ASCERTAINING THE NET WEIGHT OF A PRODUCT IN A SINGLE PRODUCT RANGE

(71) Applicant: Wipotec Wiege- und Positioniersysteme GmbH, Kaiserslautern (DE)

(72) Inventors: Peter Monz, Kindsbach (DE); Michael Siegrist, Kaiserslautern (DE); Bernd Zinke, Mandelbachtal (DE)

(73) Assignee: Wipotec-Wiege- und Positioniersysteme GmbH, Kaiserslautern (DE)

( * ) Notice: Subject to any disclaimer, the term of this patent is extended or adjusted under 35 U.S.C. 154(b) by 281 days.

(21) Appl. No.: 15/309,562

(22) PCT Filed: Apr. 30, 2015

(86) PCT No.: PCT/DE2015/100176
§ 371 (c)(1),
(2) Date: Mar. 15, 2017

(87) PCT Pub. No.: WO2015/169281
PCT Pub. Date: Nov. 12, 2015

(65) Prior Publication Data
US 2017/0211966 A1 Jul. 27, 2017

(30) Foreign Application Priority Data
May 8, 2014 (DE) .................... 10 2014 106 509

(51) Int. Cl.
*G01G 9/00* (2006.01)
*G01G 11/00* (2006.01)
(52) U.S. Cl.
CPC ............ *G01G 9/005* (2013.01); *G01G 11/00* (2013.01)

(58) Field of Classification Search
CPC .............................. G01G 9/005; G01G 11/00
(Continued)

(56) References Cited

U.S. PATENT DOCUMENTS 5,280,513 A * 1/1994 Meltzer ................ G01G 9/005
378/86
5,585,603 A 12/1996 Vogeley, Jr.
6,215,845 B1 * 4/2001 Knigge ................ G01N 23/02
378/57

(Continued)

FOREIGN PATENT DOCUMENTS

CN    101802595 A    8/2010
CN    103395521 A    11/2013
(Continued)

OTHER PUBLICATIONS

Translate JP-2013019688-A Jan. 2013 (Year: 2013).*

*Primary Examiner* — Natalie Huls
*Assistant Examiner* — Monica S Young
(74) *Attorney, Agent, or Firm* — The Webb Law Firm

(57) ABSTRACT

The invention relates to a method for ascertaining a net weight of a product in a product range, plurality of contiguous product ranges form a product chain and a total weight of the product chain is ascertained. The product chain is X-rayed to ascertain values that correspond to the radiation that penetrates a defined range of the product chain. The ascertained values are used to ascertain a total value for the entire product chain. A product range with a single product is selected by means of evaluation of the ascertained values. A value of the product range is formed from the ascertained values. A gross weight of the product range is ascertained therefrom. The net weight used for the single product is approximately the weight or the net weight is ascertained from the difference between the weight and a prescribed or ascertained weight of the product range without a product.

12 Claims, 11 Drawing Sheets

(58) Field of Classification Search
USPC .......................................................... 177/1
See application file for complete search history.

(56) References Cited

U.S. PATENT DOCUMENTS

| | | | |
|---|---|---|---|
| 2005/0084064 A1* | 4/2005 | McIntyre | G01N 23/04 378/54 |
| 2010/0150308 A1* | 6/2010 | Tsuno | A01K 43/08 378/54 |
| 2010/0202694 A1* | 8/2010 | Kabumoto | G01N 21/3581 382/190 |
| 2010/0256952 A1* | 10/2010 | Dekker | G01G 9/005 702/180 |
| 2011/0131934 A1 | 6/2011 | Bierschenk et al. | |
| 2015/0051513 A1 | 2/2015 | Hunter et al. | |
| 2016/0140413 A1* | 5/2016 | Maga | G01N 23/10 382/195 |

FOREIGN PATENT DOCUMENTS

| | | |
|---|---|---|
| DE | 10136980 A1 | 9/2002 |
| DE | 102007022578 A1 | 11/2008 |
| EP | 2198703 A2 | 6/2010 |
| JP | 59178259 U | 11/1984 |
| JP | 3289407 A | 12/1991 |
| JP | 2004177366 A | 6/2004 |
| JP | 2005187170 A | 7/2005 |
| JP | 2008209307 A | 9/2008 |
| JP | 200985876 A | 4/2009 |
| JP | 2011203067 A | 10/2011 |
| JP | 201319688 A | 1/2013 |
| JP | 2013019688 A * | 1/2013 |
| WO | 2008095500 A2 | 8/2008 |
| WO | 2009041393 A1 | 4/2009 |
| WO | 2011050355 A1 | 4/2011 |

* cited by examiner

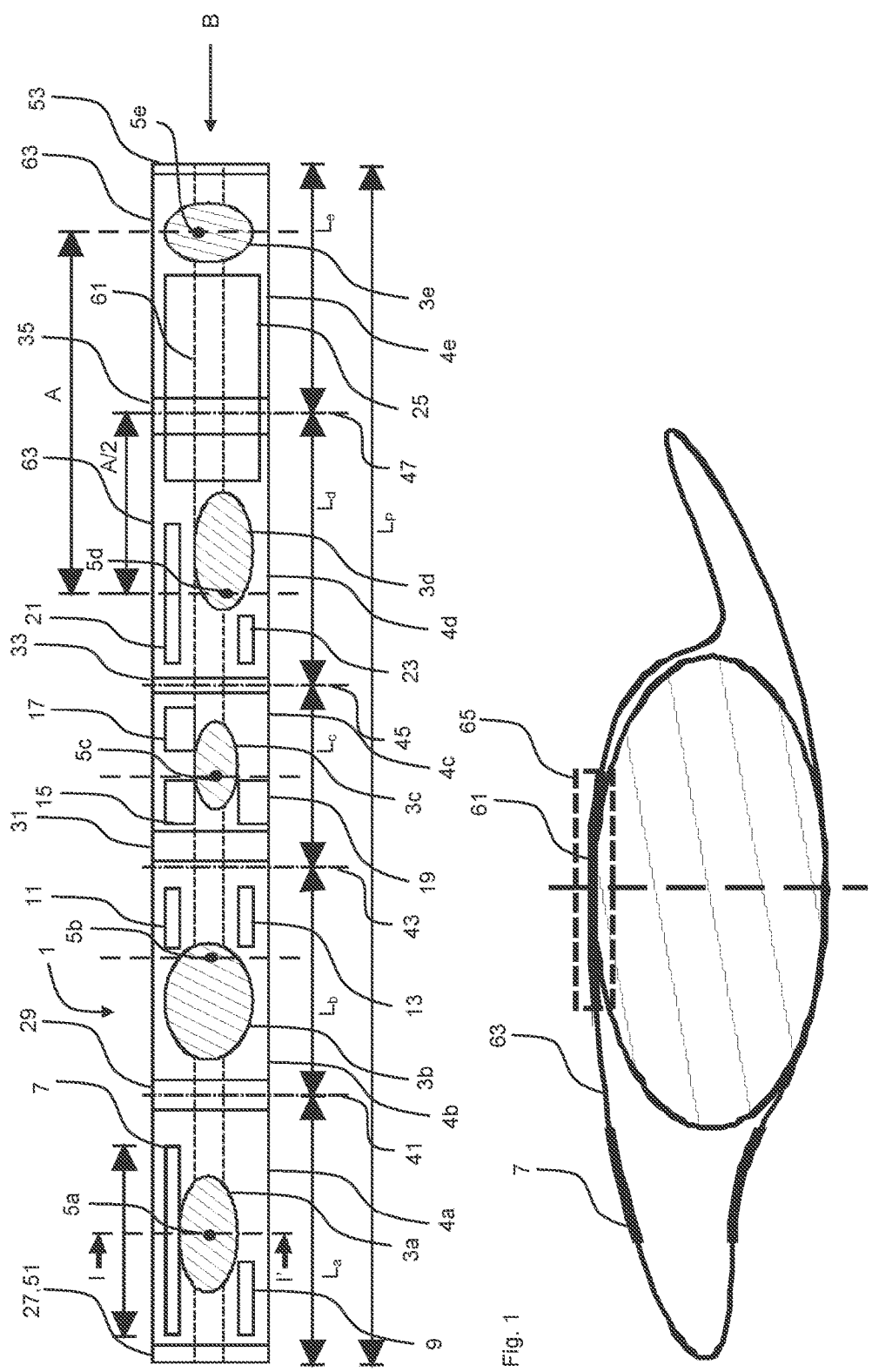

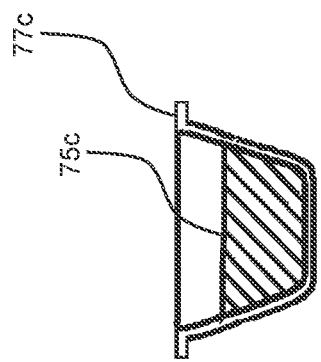
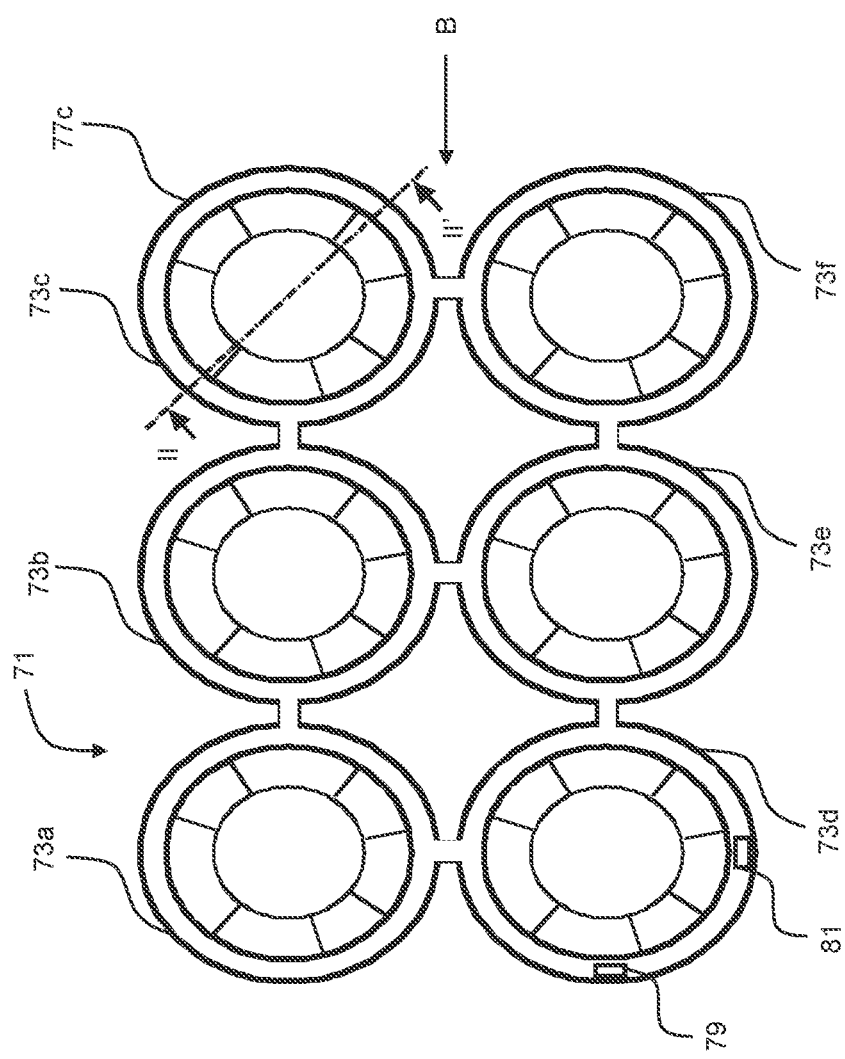
Fig. 4
Fig. 3

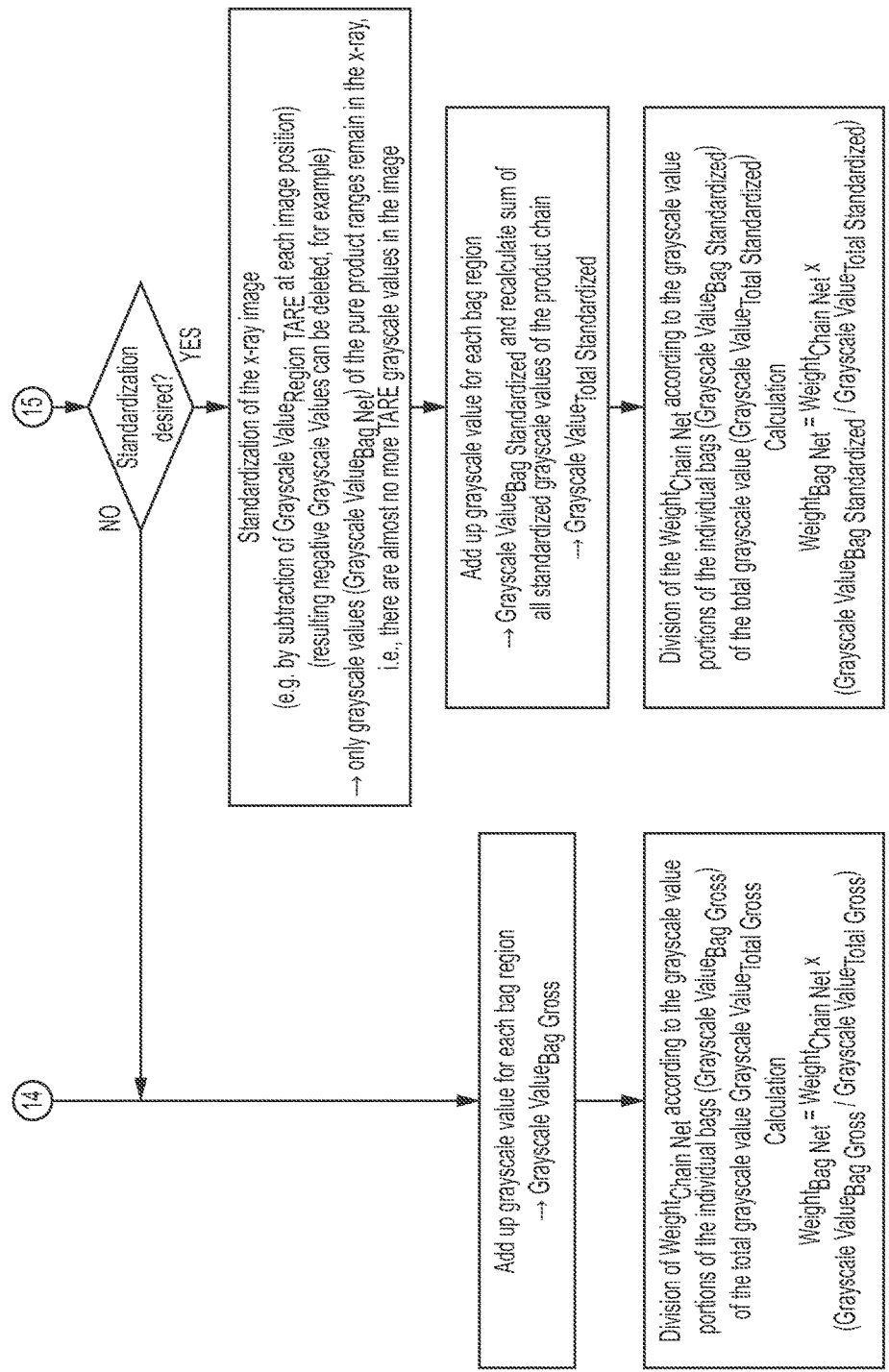

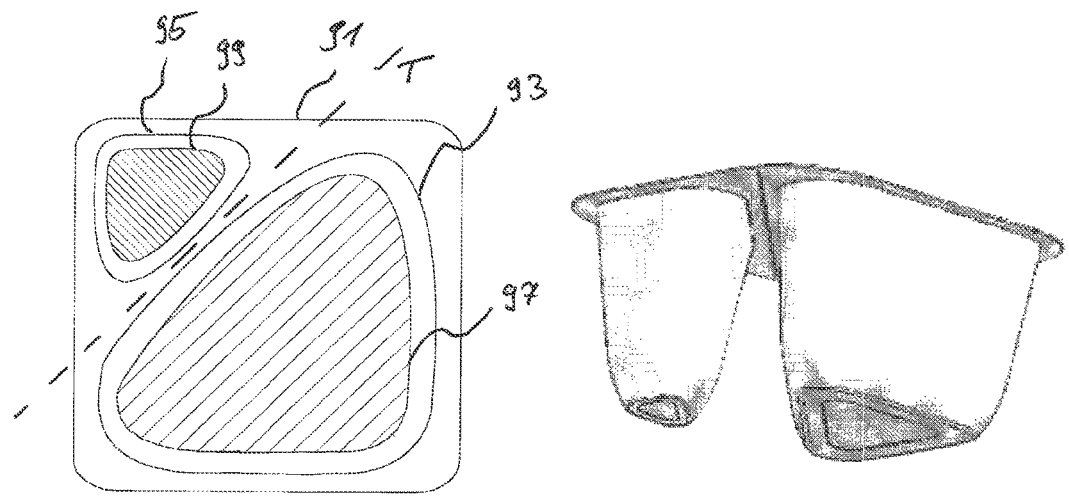
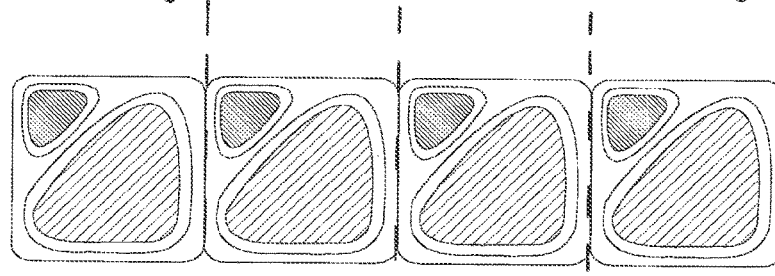

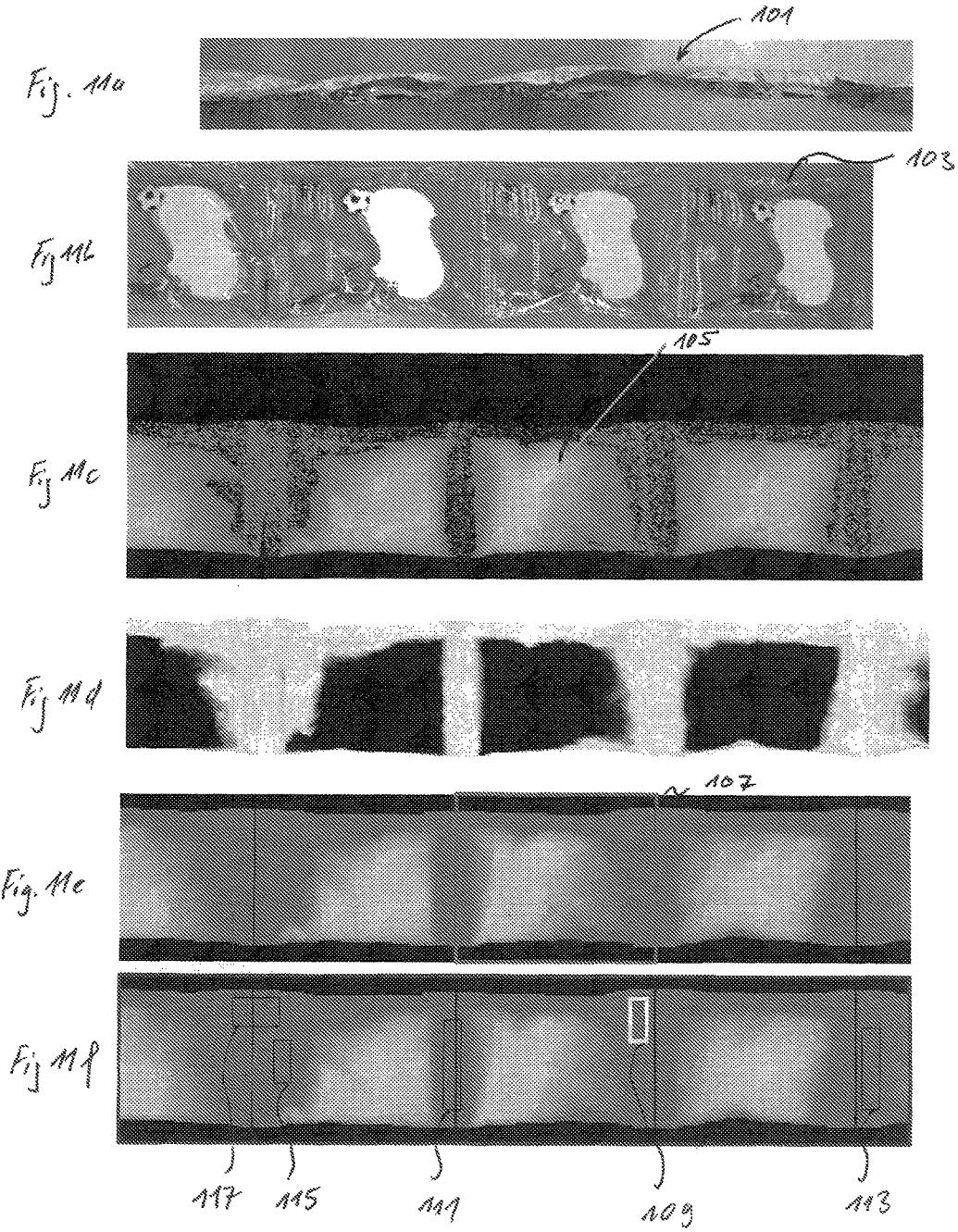

METHOD FOR ASCERTAINING THE NET WEIGHT OF A PRODUCT IN A SINGLE PRODUCT RANGE

CROSS-REFERENCE TO RELATED APPLICATIONS

This application is the United States national phase of International Application No. PCT/DE2015/100176 filed Apr. 30, 2015, and claims priority to German Patent Application No. 10 2014 106 509.3 filed May 8, 2014, the disclosures of which are hereby incorporated in their entirety by reference.

BACKGROUND OF THE INVENTION

Field of the Invention

The invention relates to a method for determining a net weight of a product in a single product range. Such a method can be used, among other things, in the food industry in the production of prepacks. Usually, tube bags (e.g., chips bags) are used as enveloping packaging.

Description of Related Art

These tube bags are made of a thin film that is first rolled off as a long flat sheet from a roll, then folded and sealed on one side (fold). The resulting tube is then sealed on the lower side so that it creates a fillable sack or bag. This will be filled with the product to be packaged and then likewise sealed on the dividing line serving as the top side.

The upper seal of the first package serves at the same time as the lower seal for the subsequent second package. Then the sealed first tube bag can be separated from the subsequent strand, in other words from the second bag, and individually processed.

Processing may include, for example, an inspection and check of the air-tightness, label or content of the bag. The contents of the bag, in other words, the product contained in the bag, is usually checked by weighing the separated bags. Metal detectors or x-ray inspection equipment are used to test for prohibited impurities. The label on the bag can be analyzed using image recognition (barcode scanners, etc.).

The whole procedure for product filling and bag inspection can be performed both in separate machines and plants and essentially in a compact filling/packing/inspection machine.

In many cases, it is advantageous or desirable not to separate the bags immediately after filling but to process them as one continuous strand or chain of products. In this case, the packages are in the form of a continuous product chain of filled and sealed tube bags.

If the filled tube bags are still in the form of a continuous product chain and are to be weighed in the interconnected structure, for example, to monitor, control, or regulate the filling elements of the filling machine, then it is necessary to determine the precise product mass in each individual bag that is required for fill head adjustment.

The measuring process requires a high degree of accuracy to ensure a predefined or, if applicable, legally required net weight of the product mass within narrow tolerances (e.g., +/−0.1 g) when filling.

In addition, industrially manufactured prepacks are usually produced at very high speed or with very high throughput so that the weighing must occur while moving, in other words, the package to be weighed is moving during weighing and not standing still (dynamic weighing).

As a matter of principle, with dynamic weighing, a differentiation is made between continuous weighing and discontinuous weighing. For continuous weighing, conveyor belt scales are used that determine the temporal mass flow for an endless (continuous) flow of loose bulk material to be weighed. For discontinuous weighing, automatic scales are used for individual weighing (so-called catch weighers) and automatic check scales (so-called check weighers), which are able to determine the individual weight values of discrete (separate) individual packages or containers.

However, when examining an above-mentioned continuous product chain, the weight of the product in the individual bags cannot be determined accurately enough with conveyor belt scale nor with check weighers or catch weighers, since the contiguously connected bags exercise mechanical coupling forces on one another, which result in inadmissible measurement deviations due to this "shunting".

The main reason for this is that a conveyor belt scale can only determine a mass flow as a measurement result, the chronological sequence of which, however, only allows rough conclusions about the individual weight in the individual bags. By contrast, check weighers and catch weighers, as discontinuous weighing scales, usually presume only a single package to be weighed separately (discretely) on the scale platform and, due to the "shunting" between the contiguous bags of the product chain, can only provide imprecise measurement results.

The situation becomes even more difficult, if the weighing device, as the sole measurement checking device in the production of prepacks, is to ensure a 100% inspection and meet the legal requirements. This weighing device must then have an official type approval and the serial device must pass a regular metrological test (recalibration). In addition to the high degree of measurement accuracy, this requires a high reproducibility of the measurements.

SUMMARY OF THE INVENTION

Therefore, the object of the present invention is to create a method and a device for its implementation, which allow a determination of the net filling quantity (in particular of the net weight) of a product in an individual product range within a product chain with multiple connected (mechanically coupled) product ranges (multiple packages with only one chamber or one product range or one preferably isolated package with multiple chambers) with high degree of accuracy and speed.

For the purposes of the invention, an x-ray refers to irradiation with a source of radiation (in particular, an x-ray source) and inspecting with a radiation-sensitive detector, in particular, a camera.

Below, the term weight that is common in general language usage and commerce, such as gross or total weight and net weight of a sample or product, tare weight (TARE), etc., will be used although the physically correct term would be mass.

The following method can be executed in part (semi-automatically) or completely manually or preferably automatically, e.g., by a control, in particular by an evaluation device and/or a control device. Moreover, processing steps can be taken, such as sorting, classifying, unloading (or the control of corresponding devices such as sorting devices, classifying devices, etc.) depending on the values determined in accordance with the invention.

According to the invention, one product chain consisting of several connected (mechanically coupled) product ranges (preferably each product chain) will be both weighed (Weight$_{Total\ Gross}$) and x-rayed as a whole. Preferably, each product chain will be weighed (each time). Alternatively, the total weight (Weight$_{Total\ Gross}$) can be determined, whereby a reference value (for example, a grayscale value) is formed by one-time weighing and each product chain is only compared to this reference value. As a result of the x-raying of the product chain with an x-ray device, values (grayscale values) are determined, which correspond to those x-rays that penetrate a defined area of the product chain or the entire product chain, i.e., have not been absorbed by the product or by the packaging material.

A total, in particular a cumulated or integrated total value (Grayscale Value$_{Total\ Gross}$) from the aforementioned obtained values can be determined line by line or from a single x-ray image or a single x-ray image of the entire product chain. Individual values for the product chain can also be obtained both line by line or from a single x-ray image of the entire product chain (using image evaluation).

Through simple division (Weight$_{Total\ Gross}$/Grayscale Value$_{Total\ Gross}$), a rough reference value Ref$_{Gross}$ in the unit [grams per grayscale value] can be determined for the product chain. However, it does not take into account the differences in density between the product and the packaging material. Also, the product itself can be composed of different materials and/or cereals (foods), e.g., in bags with packet soup (with noodles, peas, pieces of meat, etc.).

Furthermore, according to the invention, ranges with an individual product contained therein (product ranges) will be pre-defined or selected by analyzing the determined values. Such a selection can be made, for example, by a detected rapid increase or decrease in the determined values. With a product flow moving in the longitudinal direction of the product chain with an essentially constant width of the product chain, such a (product) range can exist as a longitudinal section. However, it is of course also possible to determine an arbitrary, flat area (envelope curve or the contour surrounding the individual product by means of image analysis) or to pre-define it (particularly in the case of a previously known position and/or dimension of the product).

The position of a straight dividing line between two contiguous packages or the distance between two products can be determined or established by analyzing the values obtained, to be able to differentiate between individual products (packed in chambers). Therefore, it is possible, for example, to detect or establish a dividing line (separation is detected and (logical) dividing line (logical packaging) is established) through an analysis of the grayscale values obtained (half distance contiguous maxima or from ranges above a certain value, perhaps including averaging, etc.) and, based on that, to define ranges (bag region) with (or without) the respective product contained therein. Such a defined dividing line does not have to match an actual, existing seam, in particular, a sealed seam.

According to the invention, after the division of the product chain into product ranges, a value (Grayscale Value$_{Product\ Range\ Gross}$) is determined for each range with product (bag region) or each "logical" package by adding up or integrating the values obtained, in particular grayscale values, from dividing line to dividing line (or within an envelope curve).

From the aforementioned values, in accordance with the invention, a weight of the individual range with the product contained therein (Weight$_{Product\ Range\ Gross}$) can be determined from the relationship.

$$Weight_{Product\ Range\ Gross} = \frac{Grayscale\ Value_{Product\ Range\ Gross}}{Grayscale\ Value_{Total\ Gross}} \times Weight_{Total\ Gross} = Grayscale\ Value_{Product\ Range\ Gross} \times Ref_{Gross}$$

If the weight of the packaging material is very much smaller than the net weight of the product in the product range, then the gross weight (Weight$_{Product\ Range\ Gross}$) determined according to the method of the invention can be considered the net weight (Weight$_{Product\ Range\ Net}$) of the product as a sufficient approximation. This assumption can be made for the individual product range (one chamber of a multi-chamber package or a single-chamber package) or for the entire product chain.

According to the invention, other details of a net filling quantity, such as a net volume of the product contained in the package, can also be obtained from the determined net weight. Such details can be obtained easily from the determined net weight by conversion using previously known parameters of the product chain. For example, with a pre-defined, preferably homogeneous, product density, a net volume can be easily obtained by multiplication with the determined net weight.

The method in accordance with the invention preferably also allows the determination of the net filling quantity of an individual product range in a product chain with multiple connecting (mechanically coupled) product ranges, while such a product chain is moving and additional processing steps follow a filling and sealing process. Thus, in a production line, quality assurance measures, such as inspection for foreign bodies, contamination, label checks, etc., can follow, wherein the method in accordance with the invention can be integrated after the filling and presence of a product chain at an arbitrary position in the production line (as an integral component thereof) or can be formed as a separate inspection device.

In a further embodiment of the invention, the weight of the product range without product (TARE weight of a product range) Weight$_{TARE}$ can be known in advance or determined. Likewise, the TARE weight of the product chain (Weight$_{Total\ TARE}$) could be known in advance or determined.

In contrast to the approach explained above, the net weight of the product in a package (Weight$_{Product\ Range\ Net}$) or the net weight of the product chain (Weight$_{Total\ Net}$) is now determined from the difference of gross weight and a pre-defined or determined TARE weight.

$$Weight_{Product\ Range\ Net} = Weight_{Product\ Range\ Gross} - Weight_{TARE}$$

or $$Weight_{Total\ Net} = Weight_{Total\ Gross} - Weight_{TotalTARE}$$

In another embodiment of the invention, the weight of the packing material (Weight$_{TARE}$/L) per length unit (e.g., in grams per meter) or per area unit (e.g., in grams per square centimeter) can be known in advance or determined. The weight of the individual product range without product (Weight$_{TARE}$) can thus be calculated from the Weight$_{TARE}$/L and the detected area of the product range or the detected total area of the product chain (or their lengths with constant width ($\text{Length}_{Product\ Range}$ or $\text{Length}_{Total}$)). The area or length can preferably be determined by radioscopy (and corresponding image analysis). However, alternatively an optical sensor, e.g., a light barrier or an optical camera, can be used.

$$\text{Weight}_{TARE} = \frac{\text{Weight}_{TARE}}{L} \times \text{Area of the range}$$

$$\text{Area of the range} = \text{Length}_{Product\ Range} \times (\text{constant})\ \text{width}$$

The net weight of the product in a package ($\text{Weight}_{Product\ Range\ Net}$) can be recalculated from the difference of the gross weight ($\text{Weight}_{Product\ Range\ Gross}$) and the weight of the package without product ($\text{Weight}_{TARE}$).

$$\text{Weight}_{Product\ Range\ Net} = \text{Weight}_{Product\ Range\ Gross} - \text{Weight}_{TARE}$$

In a further embodiment of the invention, at least one sub-region (e.g., rectangular) without product within the product chain will be pre-defined (TARE region) and a grayscale value or a grayscale value figure (Grayscale $\text{Value}_{Region\ TARE}$) and the area of the TARE region $\text{Area}_{Region\ TARE}$ will be determined for this (Following, the terms "grayscale value figure" and "grayscale value" are used interchangeably.) Preferably, multiple TARE regions can also be defined and their average grayscale value determined. From this, a grayscale value TARE can be formed by means of division, depending on at least one dimension parameter (preferably the length or area).

The definition of the sub-region can exist before the analysis of the obtained grayscale values in the different variants and can be changed during an analysis by means of a causality test to an expected value range. It is also possible to define a TARE region by analyzing the grayscale values (similar to establishing the product ranges) (through image analysis or threshold observation, for example, a range of consistently low values, in other words, minima or values below a grayscale threshold value).

If the weight ($\text{Weight}_{Region\ TARE}$) of the previously selected (guaranteed product-free) TARE region is known, or has been determined, e.g., by multiplication of the grayscale value (Grayscale $\text{Value}_{Region\ TARE}$) with the reference ($\text{Ref}_{Gross}$), then the TARE weight of the total bag can be calculated subsequently. This is done through the ratio of the $\text{Area}_{Region\ TARE}$ of the TARE region to the $\text{Area}_{Product\ Range}$ of the product range in the x-ray image, and is permissible because a packaging material showing a TARE all around the product is also in the area with the product (product region).

$$\text{Weight}_{Region\ TARE} = \text{Ref}_{Gross} \times \text{Grayscale Value}_{Region\ TARE}$$

$$\text{Weight}_{TARE} = \text{Weight}_{Region\ TARE} \times \frac{\text{Area}_{Product\ Range}}{\text{Area}_{Region\ TARE}}$$

If, from a (preferably one-time) reference measurement with a TARE section of an empty package of any size (for example, a piece of a package), both its weight ($\text{Weight}_{Section\ TARE}$) and its grayscale value (Grayscale $\text{Value}_{Section\ TARE}$) and area (or length) can be determined in advance, instead of the $\text{Ref}_{Gross}$, the better suited $\text{Ref}_{TARE}$ can be used to improve the TARE determination.

$$\text{Ref}_{TARE} = \text{Weight}_{Section\ TARE} / \text{Grayscale Value}_{Section\ TARE}$$

The aforementioned methods neglect the fact that the total weight of the product chain determined at the start ($\text{Weight}_{Total\ Gross}$) and the total grayscale value of the product chain (Grayscale $\text{Value}_{Total\ Gross}$) represent a mixture of the product and the packing material, which however have different densities.

Therefore, in a preferred embodiment of the invention, the TARE weight of the entire product chain ($\text{Weight}_{Total\ TARE}$) is determined.

This can occur, e.g. when the weight of the packing material ($\text{Weight}_{Length\ TARE}$) per length unit (e.g., in grams per meter) or per area unit (e.g., in grams per square centimeter) is known in advance or is determined and is multiplied with the detected area $\text{Area}_{Total}$ of the product chain (or its length $\text{Length}_{Total}$ with a consistent width), and from that the TARE weight of the entire product chain ($\text{Weight}_{Chain\ TARE}$) is calculated. The area or length of the product chain can preferably be determined by radioscopy (and corresponding image analysis).

$$\text{Weight}_{Total\ TARE} = \text{Weight}_{Length\ TARE} \times \text{Length}_{Total}$$

Then the net weight of the product chain ($\text{Weight}_{Total\ Net}$) can be calculated from the difference of the gross weight of the product chain ($\text{Weight}_{Total\ Gross}$) and the TARE weight of the product chain ($\text{Weight}_{Total\ TARE}$).

$$\text{Weight}_{Total\ Net} = \text{Weight}_{Total\ Gross} - \text{Weight}_{TotalTARE}$$

After that, the determined net weight of the total product chain ($\text{Weight}_{Total\ Net}$) can be divided into correct portions for the individual bags. This can be done, in accordance with the invention, through a simple ratio calculation. The summed grayscale values of the bag region (Grayscale $\text{Value}_{Product\ Range\ Gross}$) are placed in a ratio to the total grayscale value of the product chain (Grayscale $\text{Value}_{Total\ Gross}$).

$$\text{Weight}_{Product\ Range\ Net} = \text{Weight}_{Total\ Net} \times (\text{Grayscale Value}_{Product\ Range\ Gross} / \text{Grayscale Value}_{Total\ Gross})$$

This method no longer uses the possibly erroneous approximate reference value $\text{Ref}_{Gross}$, however, in the integration of the grayscale value for each bag also ignores that the product and the packaging material have different densities. Because in the product region, the product is overlaid with the lower and upper packaging film.

Therefore, in another preferred embodiment of the invention, a standardization of the x-ray image is performed before the integration of the grayscale value (Grayscale $\text{Value}_{Product\ Range\ Gross}$) of the bag.

As described above, first the TARE weight of the total product chain ($\text{Weight}_{Total\ TARE}$) is determined.

For this purpose, at least one sub-region of a package is predefined again (TARE region) and for this purpose a grayscale value (Grayscale $\text{Value}_{Region\ TARE}$) depending on at least one dimension parameter and the area $\text{Area}_{Region\ TARE}$ is determined. Preferably, multiple TARE regions can also be defined and their average grayscale value can be determined.

The definition of the sub-region can exist before analysis of the obtained grayscale values in different variations and can be changed during a causality test analysis to an expected value range Furthermore, it is also possible to define a TARE region through analysis of the grayscale values (for example, range with consistently low values, i.e., minima).

If the weight (Weight$_{Region\ TARE}$) of the previously selected (guaranteed product-free) TARE region is known, or has been determined, e.g., by multiplication of the grayscale value (Grayscale Value$_{Region\ TARE}$) with the reference (Ref$_{Gross}$), then the TARE weight of the entire product chain Weight$_{Total\ TARE}$ can be calculated. This is done through the ratio of the Area$_{Region\ TARE}$ of the TARE region to the Area$_{Total}$ of the product chain in the x-ray, and is permissible, because also in the range with a product (product region), there is a packaging material all around the product representing the TARE.

$$Weight_{Region\ TARE} = Ref_{Gross} \times Grayscale\ Value_{Region\ TARE}$$

$$Weight_{Total\ TARE} = Weight_{Region\ TARE} \times \frac{Area_{Total}}{Area_{Region\ TARE}}$$

If from a (one-time) reference measurement with a TARE section, an empty package of any dimension, both its weight (Weight$_{Section\ TARE}$) and its grayscale value (Grayscale Value$_{Section\ TARE}$) and area (or length) were able to be determined, then instead of the Ref$_{Gross}$, the better suited Ref$_{TARE}$ can be used to improve the TARE determination.

$$Ref_{TARE} = Weight_{SectionTARE}/Grayscale\ Value_{SectionTARE}$$

Then the net weight of the product chain (Weight$_{Total\ Net}$) is calculated from the difference of the gross weight of the product chain (Weight$_{Total\ Gross}$) and the TARE weight of the product chain (Weight$_{Total\ TARE}$).

$$Weight_{Total\ Net} = Weight_{Total\ Gross} - WeightTotal_{TARE}$$

In a preferred embodiment of the invention, a standardization of the x-ray image can be performed thereafter. For this, you can subtract, e.g. the average grayscale value of the TARE region(s) from the overall x-ray image, and then discarded (delete) e.g. all negative grayscale values that have arisen. Then you have a standardized x-ray image, which consists only of pure grayscale values assigned to the product.

Then, the previously determined net weight of the entire product chain (Weight$_{Total\ Net}$) can be divided into correct portions for the individual bags or product ranges.

This can be done, in accordance with the invention, through a simple ratio calculation. The cumulated grayscale values of the (standardized) product range (Grayscale Value$_{Product\ Range\ Standardized}$) are placed in a ratio to the (standardized) total grayscale value of the product chain. However, the original grayscale value mix of product and packaging material (Grayscale Value$_{Total\ Gross}$) is not used, but the recalculated sum of all standardized grayscale values of the product chain (Grayscale Value$_{Total\ Standardized}$).

$$Weight_{Product\ Range\ Net} = Weight_{Total\ Net} \times (Grayscale\ Value_{Product\ Range\ Standardized}/Grayscale\ Value_{Total\ Standardized})$$

The advantage of the solution in accordance with the invention is that the gross total weight (for example, by weighing an empty product chain or of the packaging material for it) and, if necessary, the TARE total weight can also be determined using a calibrated scale or scales. Then the net total weight resulting from digital subtraction can be calibrated and also the net weight in the individual bags resulting from digital ratio calculation (percentage distribution).

The scale(s) can be a component of the device or positioned separately.

The weight can be determined before, during or after the x-ray. Instead of with scales, the weight can also be determined by the x-ray itself, for example, by means of so-called comparative x-ray weighing (where, through at least one-time weight reference measurement of a known reference package, the weights of all the other packages can be determined through threshold comparison of the grayscale values with those of the reference package).

Another advantage of the solution in accordance with the invention is the fact that the proportional division of the precisely determined net total weight can be derived from a single x-ray image and is independent of the calibration of the x-ray device, which may have been influenced by external influences or long-term effects.

Another advantage of this solution is that no complicated geometry analysis or area observation is required, but simple geometries, such as rectangles or triangles, can be used. However, it is also possible to use an exact geometry analysis of the border (contour) of the regions, to achieve even more accuracy.

Another advantage of the solution in accordance with the invention is that a check value K$_{RegionTARE}$ can be determined when the abovementioned TARE region(s) are used for these TARE region(s).

$$K_{Region\ TARE} = Grayscale\ Value_{Region\ TARE}/Area_{Region\ TARE}$$

The check value can be evaluated to detect impermissible deviations from a threshold and, for example, to generate a warning to the operator. The check value can be used for constant monitoring of the TARE in the ongoing production process and reporting of TARE fluctuations. However, the change in the TARE grayscale values in relation to a certain TARE area must not only be traced back to a change in the thickness of the packaging material. They can, if applicable, also be caused by changes in the x-ray device, e.g., due to fluctuations in the voltage of the x-ray tube.

If a TARE reference measurement has been conducted in advance with a known (unfilled) TARE section (see above), the check value of the TARE region K$_{RegionTARE}$ can also be compared with the check value of the KTARE section or placed in a ratio to it, e.g., to generate a correction value Corr for the entire measuring arrangement. For example, the determined TARE weight of the bag or even the net weight of the bag could be multiplied with the correction value Corr.

This correction could also or alternatively compare the current K$_{Region\ TARE}$ with chronologically older K$_{Region\ TARE}$, determine a "moving average" for the TARE and allow tracking of the "moving average".

$$K_{TARE} = Grayscale\ Value_{Section\ TARE}/Area_{Section\ TARE}$$

$$C_{orr} = K_{Region\ TARE}/K_{TARE}$$

With the invention's solution, any arising angle errors in the x-ray geometry can be corrected based on the precise knowledge of the product geometry (from the x-ray image) in a known manner.

In practical applications, the solution in accordance with the invention has had very good results for packaging material made of a thin film because there the simple absorption law could easily be applied and a constant absorption coefficient (alpha) could be assumed.

However, in one preferred solution, the solution in accordance with the invention can also be supplemented by a correction of the absorption coefficient (alpha). This correction can take into account the frequency influence, i.e., the thickness dependency of the absorption coefficient (alpha). However, it can also take into account other effects, such as the noise of the x-ray detector, the change in voltage in the x-ray tube, the coating of the packaging film with e.g. metallic materials, such as aluminum (vapor deposition) and more.

The correction can work with a correction value, which is determined, for example, by a one-time preliminary determination of the weight and the grayscale value of a representative bag both with and without product.

In accordance with the invention, the radioscopy device can operate using multiple energy levels to improve the abovementioned correction. (keyword: dual energy)

In accordance with the invention, the above-mentioned sub-regions can be selected arbitrarily, in other words also across packages.

In a further embodiment of the invention, multiple sub-regions (TARE regions) can be pre-defined, as explained above. A grayscale value (Grayscale Value$_{TARE}$) can then be determined across all TARE regions, depending on at least one dimension parameter, wherein averaging is possible, particularly with varying individual grayscale values.

In a further embodiment of the invention, multiple product chains can be processed in parallel so that the determination of the net filling quantity in accordance with the invention can take place simultaneously for packages in product chains that are next to each other and not connected to each other.

However, it is also conceivable of course that a product chain has connected packages next to each other in the form of an array (of multiple lines and columns) not only in the movement direction, but also transverse to the movement direction. In the case of multiple tracks, multiple single scales or a common up- or downstream scale can be used to weigh the product chains.

The invention is not limited to a continuous product chain or a continuous array of containers with only one chamber or only a single product range each. It is also suitable for determining the net filling quantity in possibly already isolated containers, which however have multiple separate, connected chambers or product ranges (and thus a product chain with multiple connected product ranges), e.g., for the main product (e.g., yogurt) and for foods (e.g., fruit or chocolate chips). Since such containers arise from deep-drawing a continuous strand of a thick, continuous film and are not separated until after filling, according to the known prior art, separate weighing of the unfilled container (TARE) is not possible in the running production, and thus control of the filling process is also not possible. As an alternative, according to the known prior art, multiple weighings, before and after the filling of the individual chambers, can be selected. However, this will disadvantageously require multiple scales or time-intensive weighing on only one scale using a logistically complicated procedure in the production line.

During the manufacture of a single-chamber cup by deep-drawing from a circular blank, for example, the thickness of the deep-drawn material changes in the drawn inner areas of the circular blank. However, the x-ray image shows the deep-drawn cup the same as the original flat circular blank. Therefore, the method in accordance with the invention can also be used for complicated deep-drawn containers, without the need to analyze punched-out (empty) intermediate ranges, for example.

Also, with a loose product (e.g., powder) in a tube bag, no complex image analysis of the mostly severely fissured product ranges is necessary, which would also be strongly influenced by the energy level of the x-rays used.

A further embodiment of the invention is used if the packaging material has a thickness that fluctuates greatly across its length and width. Then, in accordance with the invention, a TARE x-ray image of the unfilled package is taken. This TARE x-ray is then subtracted pixel-by-pixel from the gross x-ray image in the filled state. To do this, it is necessary that the position of the object be as identical as possible for the x-rays. Alternatively, through image processing and through the use of so-called fiducial markers on the product chain, a congruent allocation of pixels in both x-ray images can be produced subsequently. This abovementioned method can be applied particularly in the pharmaceutical industry, where the TARE (and thus the relative thickness fluctuation of the packaging material) is very large compared to the nominal filling quantity (net).

The method in accordance with the invention can be used not only to check and monitor (log) the net filling quantity but also to monitor, control or regulate a piece of equipment for filling, for example, the filling elements of a filling device.

To allow a particularly high processing speed, the net weight or net filling quantity of a product in a single package (Weight$_{Net}$) can be determined dynamically, in other words, while the package or product chain is moving. Even a non-clocked, i.e., continuous, even movement of the product chain is possible.

In the preferred embodiments of the invention explained above, the weight of the package without product (Weight$_{TARE}$) is automatically determined by x-rays and analysis, in order to calculate the net filling quality and, according to the specifications, in particular the pre-packaging regulation, to check and/or to label the package.

Next to or in addition to flat product chains, it is also possible to apply the method in accordance with the invention to multi-layer product chains. For this purpose, an x-ray device can have multiple x-ray sources and detectors staggered in relation to one another to allow enhanced depth (three-dimensional) imaging.

"Bag" processing step (see flow chart, FIG. 5)
1. Weigh chain
2. X-ray chain
3. Determine gross bag
4. Determine TARE bag
5. Calculate net bag
6. Make correction, if necessary "Chain" processing step (see flow chart, FIG. 6)
1. Weigh chain
2. X-ray chain
3. Determine TARE chain
4. Calculate net chain
5. Allocate the net from the chain to the bags
6. Make correction, if necessary

BRIEF DESCRIPTION OF THE DRAWINGS

The invention will be explained in greater detail using embodiments shown in the drawings.

The drawings show:

FIG. 1 a top view of a section of a production line working according to the method in accordance with the invention (first embodiment) for filling and processing tube bags;

FIG. 2 a sectional view along line I-I' in FIG. 1;

FIG. 3 a top view of a section of a production line according to the method in accordance with the invention (second embodiment) for filling and processing cups;

FIG. 4 a sectional view along the line II-II' in FIG. 3;

FIGS. 6A-6D a "chain" flow chart variation;

FIG. 7 a top view of a multi-chamber cup;

FIG. 8 a perspective view of a multi-chamber cup according to FIG. 7;

FIG. 9 a one-column product chain of multiple multi-chamber cups according to FIG. 7 and FIG. 8 and FIG. 10 an array of a product chain of multiple multi-chamber cups according to FIG. 7 and FIG. 8.

FIG. 11a a side view of a bag chain (product chain) with multiple bags separated (divided) from each other, but connected;

FIG. 11b a top view of the bag chain according to FIG. 11a;

FIG. 11c a grayscale value image of the bag chain according to FIG. 11b;

FIG. 11d a corrected (adjusted) grayscale value image according to FIG. 11c;

FIG. 11e an inverse grayscale value image according to FIG. 11d with a delineated product range and FIG. 11f an inverse grayscale value image according to FIG. 11d with delineated TARE regions.

DETAILED DESCRIPTION

Figure 5A:
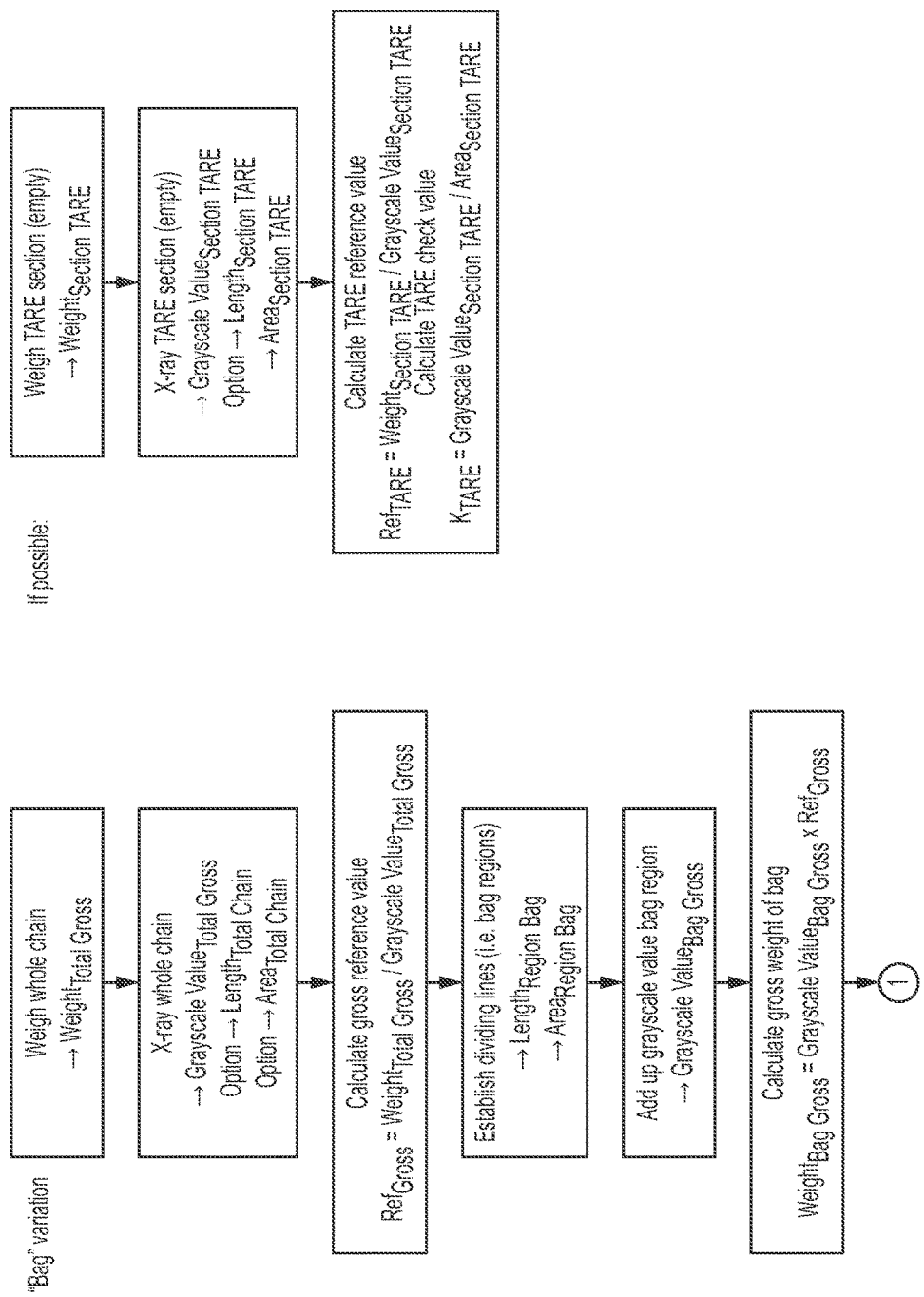
FIGS. 5A-5C a "bag" flow chart variation.

The product chain 1 shown in FIG. 1 or the product strand has multiple continuous, not separated individual packages 4a-4e (for example, in the form of bags) of products 3a to 3e contained therein. The tube formation from film sheeting of constant width located on a roll, its filling with products, and the division or separation (without separating the product chain 1) into connected packages by means of sealed seams (fused, pressed, etc.) takes place in the usual manner, as described in WO 2011/050355 A1, for example. In order to determine a net filling quantity, specifically net weight, of an individual package 4a-4e, the main problem is that the actual sealed seams 27, 29, 31, 33, 35 between the individual bags are unevenly fused and therefore the stiffness of the sealed seams 27, 29, 31, 33, 35 varies, and therefore other force effects arise between two contiguous bags. Weighing of a section within the product chain 1 therefore leads only to inaccurate results that are not sufficient to meet the requirements of the pre-packaging regulation, for example.

According to the method of the invention, the product chain 1 is, therefore, x-rayed using an x-ray device (not shown in the drawing), consisting of an x-ray source and a sensor, in particular a line sensor, such that grayscale values can be obtained based on the product chain's dimensions (length with constant width, area, etc.). To do this, a line sensor can be arranged, for example, vertically in the drawing layer to the product flow direction B below the product chain 1 and the x-ray source above the product chain 1, such that the product chain is completely captured in grayscale values from its beginning 51 to its end 53 depending on the respective longitudinal position. Of course, it is also possible to capture the entire product chain all at once using a suitable sensor (camera, motion picture, etc.) and to obtain individual grayscale values for each longitudinal position and/or area of the total image (to be read using appropriate image processing). By adding up or integrating the obtained grayscale values of the product chain 1, a Grayscale Value$_{Total\ Gross}$ can be determined for the entire product chain 1.

Furthermore, the product chain 1 can be weighed as a whole using a weighing device not shown in greater detail in the drawing and thus the weight of the product chain (Weight$_{Total\ Gross}$) determined.

In order to approximately and sufficiently define an x-ray-inspected separation, in particular a sealed seam 41, 43, 45, 47 between the individual packages 4a-4e, which may be barely detectable compared to a product 3a-3e the grayscale values obtained can be analyzed instead for this purpose. In this way, it is possible, for example, to determine maxima of grayscale values based on their longitudinal position (in direction B) in the product chain 1. Such maxima represent a point within the range, in which a product is located within the package 4a-4e, wherein this grayscale value definitely includes the upper side and lower side of the package, including the product.

For the definition of a separation 41, 43, 45, 47, a distance between two contiguous maxima can be determined and halved. FIG. 1 shows a determined (evaluated) distance A between the (grayscale value) maxima 5d and 5e, such that the seamed seal 47 has been defined at the position of the center distance A/2. Accordingly, the sealed seams 41, 43, and 45 are defined as half the distance between the contiguous (Grayscale Value) maxima 5a and 5b, 5b and 5c, 5c and 5d.

Obviously, it is also possible to define the sealed seams 41, 43, 45, 47 in another way, for example, through an analysis of the grayscale values with regard to a product range and a definition of the sealed seams 41, 43, 45, 47 outside of contiguous product ranges, for example, by halving their distance. As is shown below, a determination of the actual position of a seamed seal 41, 43, 45, 47 for the determination of as precise a net filling quantity as possible, in particular net weight (Weight$_{Net}$), is not critical or even necessary. An undesired, erroneous definition of a position of a sealed seam 41, 43, 45, 47 within an actual product range can easily be largely avoided here, or be ruled out by means of a causality test (for example, grayscale value level, which may not be exceeded for this purpose).

Accordingly, across the length $L_p$ of the product chain 1, sections are defined with the respective lengths $L_a$, $L_b$, $L_c$, $L_d$ and $L_e$. As can be seen in FIG. 1, the ends of the sections can fall at the center of an actual seamed seal, as for example in the case of sealed seams 41 and 45.

The start 51 or end 53 of the product chain can be easily and accurately detected, by contrast, through an analysis of the grayscale values of a product chain 1, generally through x-ray inspection (first or last grayscale value), wherein, due to missing grayscale values outside of the product chain, a shift of the defined limits for the determination of as precise a net filling quantity as possible, in particular net weight (Weight$_{Net}$), is not necessary.

For the packages or package sections or product ranges 4a-4e divided in this way, grayscale values for these ranges can be determined via their respective lengths $L_a$, $L_b$, $L_c$, $L_d$ and $L_e$, for example by adding up or integrating the obtained grayscale values. As a result, for each section, there is a grayscale value for the respective individual package with respective gross grayscale value of the product contained therein. To capture the package also, in particular the film, the x-ray device is precisely adjusted accordingly.

Subsequently, within a particular section or product range of the length (and position) $L_a$, $L_b$, $L_c$, $L_d$ and $L_e$, at least one sub-region (TARE region) is specified or defined, which lies within the package range or within the range of the product chain 1, in which, however, there is no product 5a-5e. Examples of this are indicated in FIG. 1 by TARE regions 7, 9, 11, 13, 15, 17, 19, 21, 23 in different positions and extensions. The products 3a-3e, which differ greatly in position and size, are only used for clarification of different positions of TARE regions, since position and range of the products 3a-3e within the respective package sections usually differ slightly from each other in product chains 1.

Such zones can be predefined based on empirical values or even based on the grayscale values obtained for a product chain by applying appropriate algorithms (image analysis). For example, ranges with an essentially constant grayscale value can be defined as a TARE region.

Since the tube bag or the product chain 1 is formed from a folded over film, not only the product region, but the entire bag is surrounded by two films (upper and lower film), which overlap, if necessary at the joint along the entire length. To better take into account the overlapped section of the film as needed, it may be advantageous to arrange the TARE region transverse to the longitudinal direction such that the overlapping (mostly at the midline) is included, preferably even over the entire width. The TARE region may also be placed exactly in a seamed seal region.

A TARE region, however, can also be defined generally across ranges (contiguous package sections), without negatively impacting the determination of as precise a net filling quantity as possible, in particular net weight (Weight$_{Product\ Range\ Net}$). For this, for example, the determined position of a seamed seal can be used and a TARE region can be defined in this range or projecting over it to a given extent. Obviously, it is also possible to determine limits for an end and a beginning of contiguous product ranges, as explained above, and to define a TARE region 25 in the intermediate range between the products 3d and 3e across the product ranges or package sections 4d and 4e.

For the particular TARE region, a grayscale value is determined based on its extension (length and/or area) and projected onto the particular section or product range 4a-4e with the length $L_a$, $L_b$, $L_c$, $L_d$ and $L_e$. This way, a grayscale value of the package without product (Grayscale Value$_{TARE}$) can be determined.

From this grayscale value$_{TARE}$ and the already determined or existing values Grayscale Value$_{TotalGross}$ and Weight$_{TotalGross}$, the weight of a particular package section without product Weight$_{TARE}$ can be determined according to the following equation:

$$Weight_{TARE} = \frac{Grayscale\ Value_{TARE}}{Grayscale\ Value_{Total}} \times Weight_{Total\ Gross}$$

From the already determined or existing values Grayscale Value$_{Product\ Range\ Gross}$, Grayscale Value$_{Total\ Gross}$ and Weight$_{Total\ Gross}$, the weight of a particular package section with product Weight$_{Product\ Range\ Gross}$ can be determined according to the following equation:

$$Weight_{ProductRangeGross} = \frac{Grayscale\ Value_{ProductRangeGross}}{Grayscale\ Value_{TotalGross}} \times Weight_{TotalGross}$$

From the two values obtained in this way, the net weight Weight$_{Net}$ or Weight$_{Product\ Range\ Net}$ of a product contained in a package section can be calculated as follows:

$$Weight_{Net} = Weight_{Product\ Range\ Gross} - Weight_{TARE}$$

$$= \frac{Grayscale\ Value_{Product\ Range\ Gross}}{Grayscale\ Value_{Total\ Gross}} \times Weight_{Total\ Gross} -$$

$$\frac{Grayscale\ Value_{TARE}}{Grayscale\ Value_{Total\ Gross}} \times Weight_{Total\ Gross}$$

$$= \frac{Weight_{Total\ Gross}}{Grayscale\ Value_{Total\ Gross}} \times$$

$$(Grayscale\ Value_{Product\ Range\ Gross} - Grayscale\ Value_{TARE})$$

From this net weight Weight$_{Net}$ or Weight$_{Product\ Range\ Net}$, other types of a net filling quantity can also be easily determined. For example, in the case of a liquid product, a net volume could be determined by multiplication of the determined net weight Weight$_{Net}$ with a known density of the liquid.

As can be seen in FIG. 2, the product 3a is within package section 4a with a corresponding expansion (thickness) in the center below the fold 61 or the overlapping of the folded film 63. Therefore, the film 63 has in the (fold) area 65—shown in FIG. 2 as a dashed line—almost double the material density as a result of the overlap.

The left-side and right-side areas of the package not filled by the product 3a can, depending on the application, be filled with air or inert gas or have a vacuum.

The second embodiment shown in FIG. 3 and FIG. 4 shows the application of the method in accordance with the invention for another type of product chain, namely a cup chain 71, for example, a six-pack of yogurt in a 3×2 array.

This cup chain 71 has two contiguously arranged tracks or columns (cup 73a-c and 73d-f) and three rows arranged one after the other (cup 73a,d; 73b,e and 73c,f) in the product flow direction B. Here, the cups 73a-73f like the package sections in the embodiment explained above are not separated but are connected to one another (mechanically coupled).

Due to the mechanical connection, for the already filled and perhaps already sealed cups 73a-73f, it is likewise difficult or not possible to easily and quickly determine the net filling quantity of individual cup, as in the case of the abovementioned example of a tube bag strand or a product chain 1.

The above executions for the first embodiment are applied likewise, only with the difference that the product chain 1 is replaced by a two-track or two-column cup array 71. Since the cups 73a-73f are manufactured through deep-drawing, a net volume can likewise be determined by means of a TARE region arranged within the surrounding cup edge 77a-f (pre-defined or established by analysis), as explained in the first embodiment. Also, the differentiation between product range and range without product and the definition of subdivisions can also be made in the manner outlined above.

However, with a somewhat more precisely defined form (due to the deep-draw process) of the package, a TARE region can be easily specified, since position and size of the edge areas 77a-77f only have the slightest deviations and TARE regions, such as the regions 79, 81 in an edge region 77c, can be precisely specified.

By contrast, the seamed seals 29, 31, 33, 35 and start 51 and end 53 are subjected to greater deviations (seamed seal imprecise, deformed, askew, etc.) due to the production of a tube bag, such that the establishment of a TARE region in this embodiment by means of analysis of the grayscale values and subsequent definition (specification) with a possible causality test can be advantageous A grayscale value determined for a TARE region (for each length or area) can easily (from the ratio Length of TARE region to package length or area of TARE region to package area) can be extrapolated to a TARE value (Grayscale Value$_{TARE}$) of the package since the distance from product separation (seamed seal, subdivision, etc.) as the length of the package and the width of the packaging material, in particular before processing (film width before a tube formation or a deep-drawing process) are known. In the preferred embodiments of the invention, the grayscale value for the TARE film material is thus determined at least one TARE position, at which only the film portion is present (TARE region). This can be done for a known length or area so that the TARE can then be accurately calculated for the entire bag length.

This process advantageously happens automatically, quickly and with a high degree of accuracy (for example, with an accuracy of within 0.1 g). A teach-in and periodic review of a reference value (Ref$_{Tare}$, Ref$_{Gross}$) are therefore not necessarily required. TARE is determined individually for each bag in a package chain or array based on the grayscale values. TARE fluctuations due to changes in film thickness or package geometry can be automatically detected and/or corrected. The TARE is determined individually for each bag in the chain based on the grayscale values.

Such a determination of TARE for each package and its consideration in the determination of a product-only or net weight is essentially more accurate than the use of a randomly determined average TARE value.

Figure 5B:
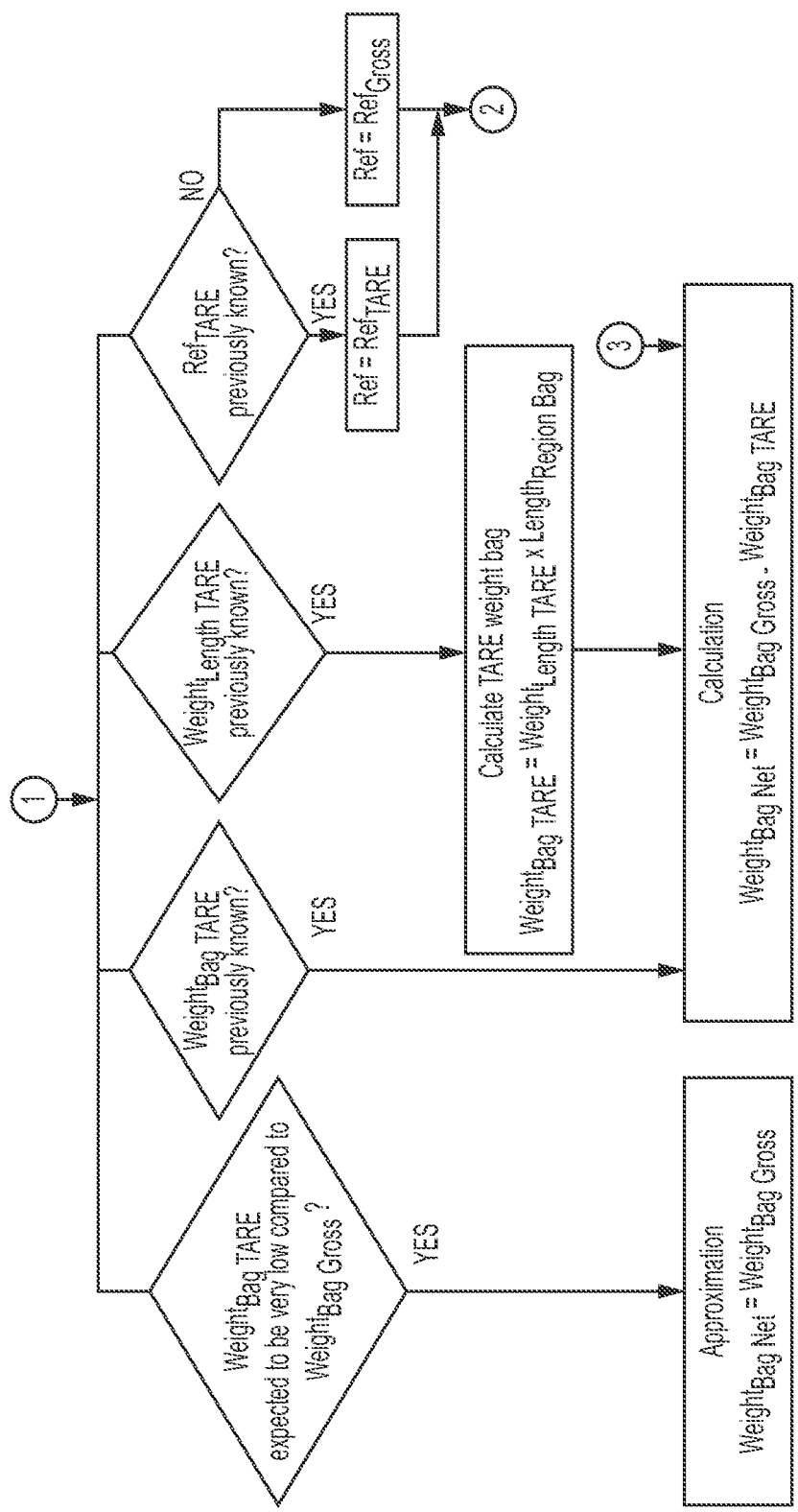
Figure 5C:
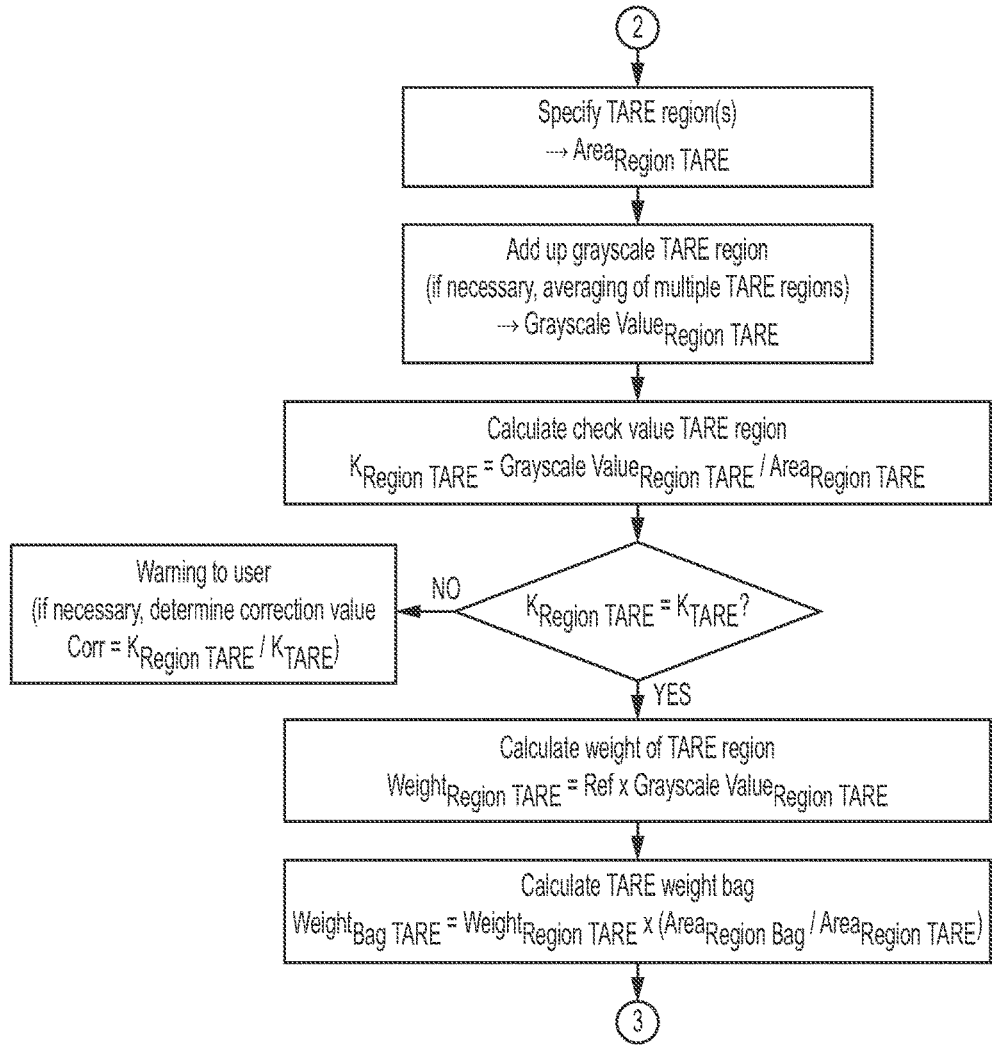
Figure 6A:
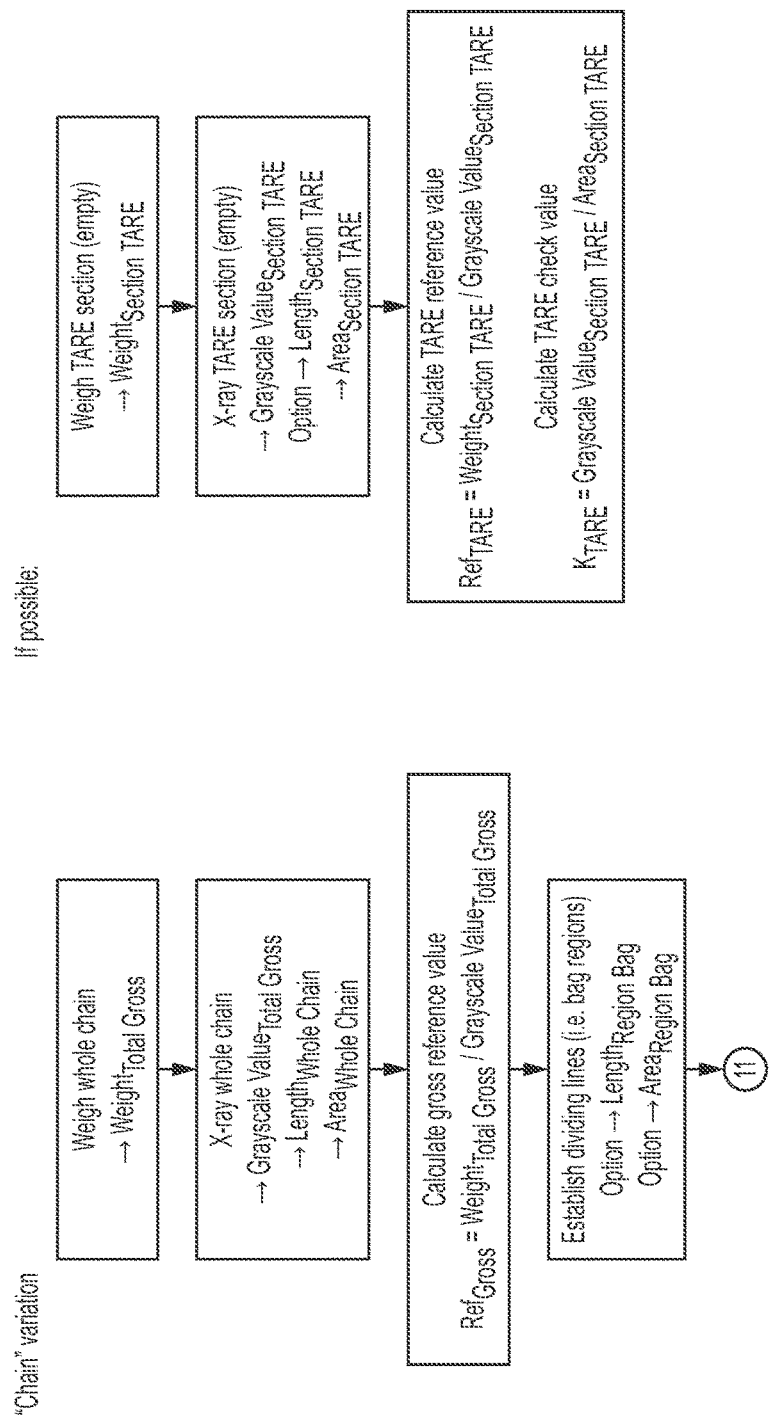
Figure 6B:
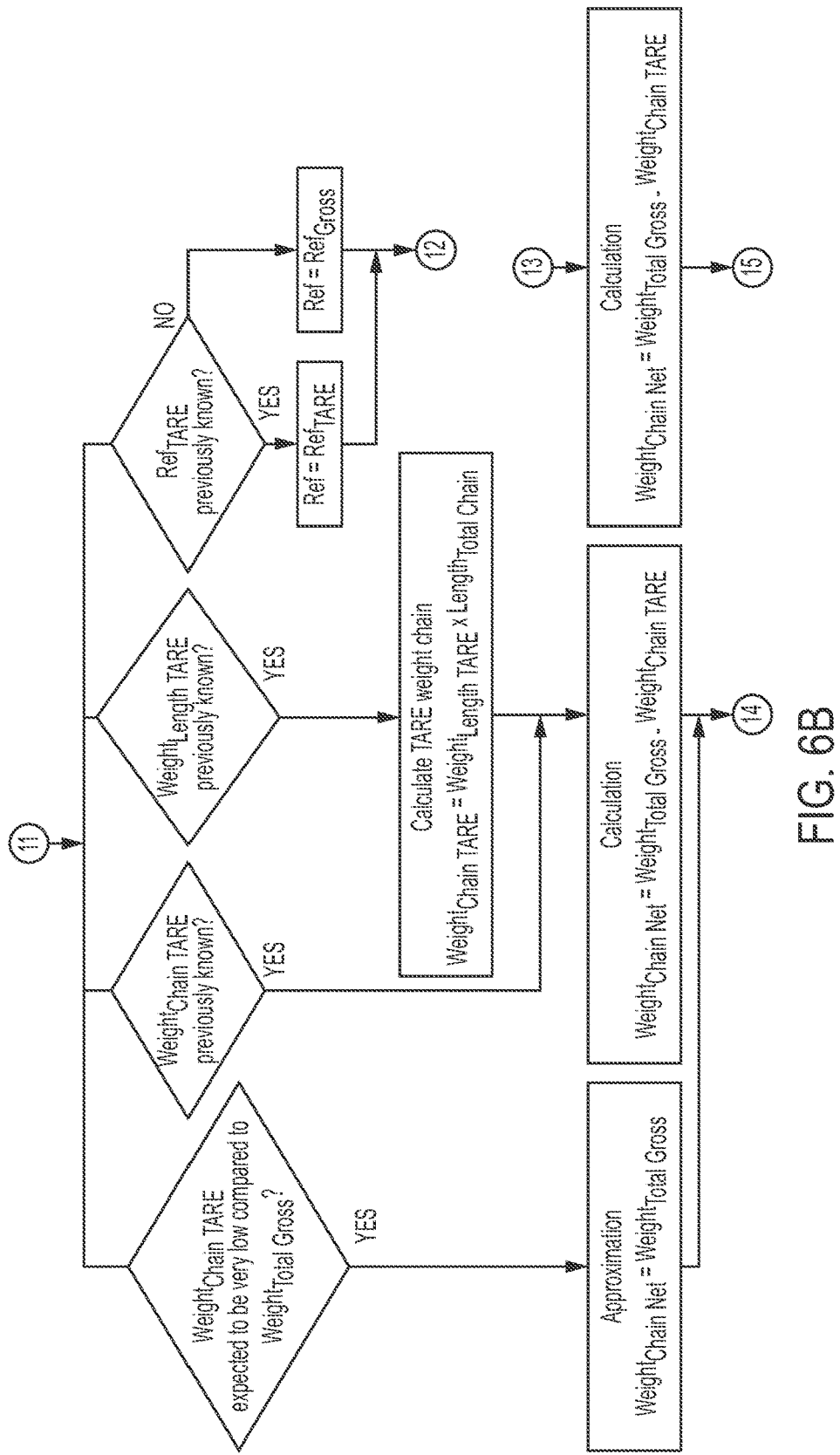
Figure 6C:
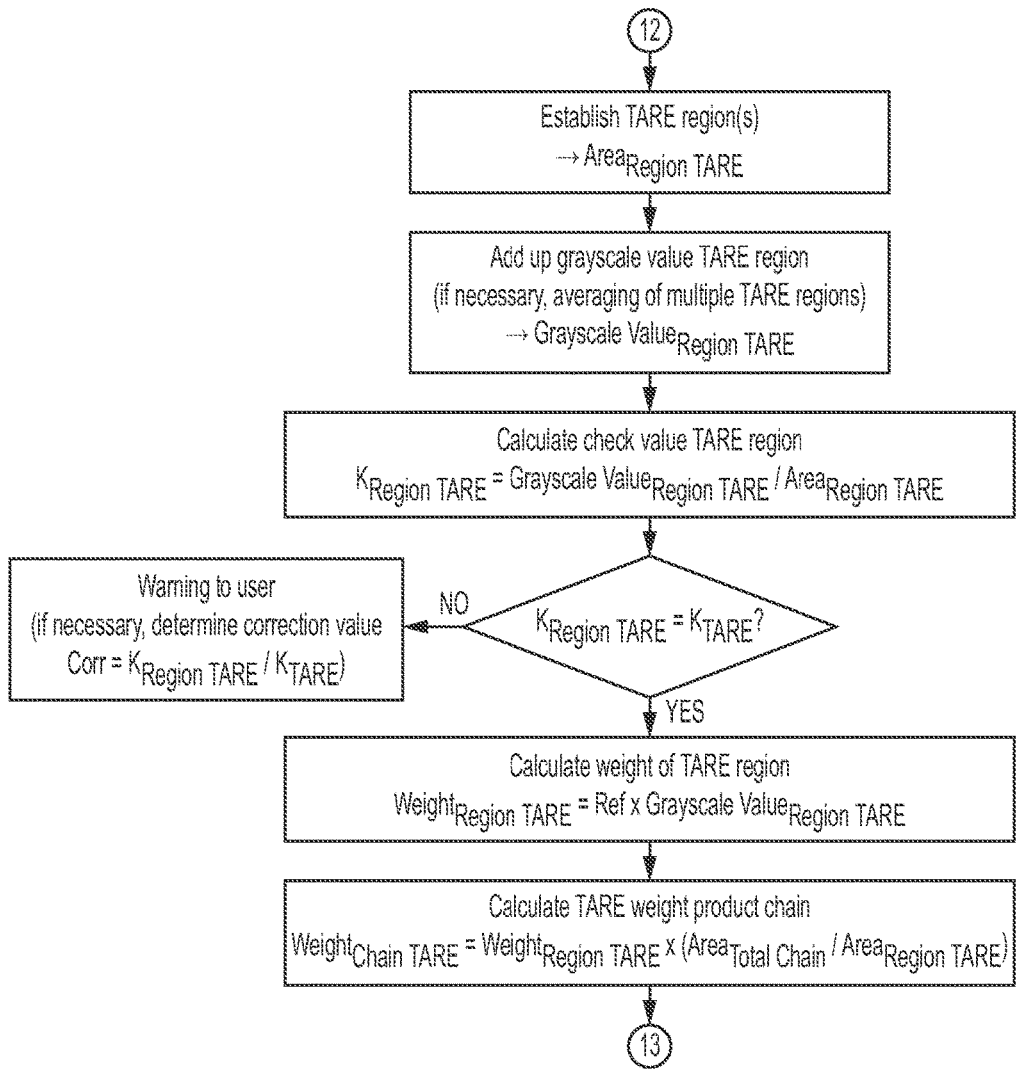

For the "Bag" and "Chain" variation flowcharts shown in FIGS. 5 and 6, the different steps explained above for determining a net filling quantity or a net weight do not need to happen in a certain chronological sequence. Rather, different steps can be taken at different points in time, before or after each other. Also, as can be seen from the flowcharts in FIG. 5 and FIG. 6, a different (claimed as an alternative in claim 1) method for achieving one and the same goal can be used.

The two flowcharts are implemented for the sake of simplicity for the example of one-chamber bags, which are connected to each other into a product chain in the form of a continuous, in particular one-column chain. Of course, the flowcharts shown can also be transferred to multi-chamber cups or bags, wherein the term "bag" used in the flowcharts should be replaced with the term "product range".

Accordingly, the following terms are used in the diagrams (FIG. 5 and FIG. 6):

Grayscale Value$_{Bag\ Gross}$ instead of Grayscale Value$_{Product\ Range\ Gross}$ Weight$_{Bag\ Net}$ instead of Weight$_{Product\ Range\ Net}$ Weight$_{Bag\ TARE}$ instead of Weight$_{TARE}$ Weight$_{Bag\ Gross}$ instead of Weight$_{Product\ Range\ Gross}$ Weight$_{Chain\ Net}$ instead of Weight$_{Total\ Net}$ Essentially, the flowcharts in FIG. 5 and FIG. 6 differ in that in the bag variation (FIG. 5) a Grayscale Value$_{Bag\ Gross}$ or a Grayscale Value$_{Product\ Range\ Gross}$ is determined earlier and the Weight$_{BagNet}$ or Weight$_{Product\ Range\ Net}$ is determined from the difference between Weight$_{Bag\ Gross}$ and Weight$_{Bag\ TARE}$ or Weight$_{TARE}$. For this purpose, the Weight$_{Bag\ TARE}$ is either approximately accepted as zero (with probably very low weight compared to Weight$_{BagGross}$) or determined in the manner specified.

By contrast, in the "chain" variation (FIG. 6), as shown, the net weight of the chain Weight$_{Chain\ Net}$ or Weight$_{Total\ Net}$ is determined by approximation or by determining the TARE weight of the chain. As a concluding step, this weight Weight$_{Total\ Net}$ is divided according to the grayscale value portions of the individual bags or product ranges and from that the weight Weight$_{Bag\ Net}$ or Weight$_{Net}$ is determined.

In both flowcharts, the right branch shows the option of a warning being issued to the user if a check value for the TARE region K$_{Region\ TARE}$ is not met compared to a previously determined check value K$_{TARE}$. With such a warning, it is possible, for example, to determine a correction value Corr based on the deviation and to use it as explained above (for example, to improve accuracy).

The multi-chamber cup 91 shown in FIG. 7 comprises, in the example shown, two separate product ranges 93 and 95. In the product range 93, there is a desired quantity of yogurt, for example, as product 97, whereas cereals, fruit preparations or the like are found separately in area 95 as product 99. As a result, the multi-chamber cup 91 must be filled in its different product ranges 93 and 95 with products 97 and 99 that differ both in type and quantity. By means of the method in accordance with the invention, it is possible not only before the application of a cover film but even after application, to check not only the quantity but also the type (due to the different density, which is reflected accordingly in the grayscale values), and to control the filling plant accordingly by means of a control device.

Due to the presence of multiple (two in the example) product ranges within a cup 91, this cup 91 in accordance with the invention can be considered a product chain.

Obviously, such multi-chamber cups, as shown in FIG. 7 and in perspective in FIG. 8, can also exist in the form of a one-column product chain as shown in FIG. 9, thus with several, for example, four connecting cups.

However, it is also conceivable, as shown in FIG. 10, that such multi-chamber cups 91, just as one-chamber cups or bags, exist as an array or matrix (with multiple columns and multiple lines). As shown in FIG. 10, such a matrix can consist, for example, of three columns and four rows, i.e., 12 multi-chamber cups 91.

In order to separate the product ranges from each other within such a cup (logically), it is possible to define a straight, diagonal dividing line T between the two product ranges 93 and 95, for example, during or following pattern detection (or image processing). However, it is also obviously possible to determine the product ranges, in particular directly through an image analysis of a total gray-scale image, for example, in the form of a circumferential line or envelope curve 93 and 95.

In the case of a one-column product chain, as shown in FIG. 9, additional contiguous cups can be differentiated from one another by a straight diagonal dividing line L$_1$, L$_2$, L$_3$ for each image analysis or threshold analysis of the detected grayscale values.

If, as is shown in FIG. 10, there are multiple (for example three) columns, then the columns can again be separated from one another through image analysis or threshold analysis of the grayscale values, by straight horizontal lines W1 and W2 (logically or for the determination of the filling weight or filling quantity). Instead of the simplified variation with straight (horizontal, vertical or diagonal) dividing lines, it is also possible to capture each product range or multiple product ranges (for example, two and thus one cup) as one unit using envelope curves. In each case, it is also possible, with multi-chamber cups 91, as shown, for each product range 93 and 95 and each individual cup 91 (whether in isolation, in a single-column product chain or an array as product chain) to record product ranges individually and preferably also one cup as a unit and to apply the method in accordance with the invention for determining the net filling quantity, in particular the net weight, to these regions.

In FIGS. 11a-11f, the method in accordance with the invention is represented using a bag chain 101 with multiple bags 102, separated (divided) from each other but connected. Such bag chains 101 can consist of a smaller number up to any larger number, such as between two, three, four, five, six to ten or even more, bags 103.

As can be seen from FIG. 11c, the product chain 101 is x-rayed in full width (top view or layout view), wherein a typical grayscale value as shown in 11c arises. Here, the ranges or product ranges in different shapes and filled with the desired product 105 (for example, powder) and separated from each other are visible, wherein different pixels or grayscale value levels are also shown in the original image in the ranges without product. These measurement errors that arise due to tolerances and errors, such as noise, for example, can preferably be corrected or eliminated before further processing by means of image analysis, so that a corrected image shown in FIG. 11d arises.

Independent of the actual or inverse representation, as shown in FIGS. 11e and 11f, product ranges 107 can now be defined using vertical (shown in red), logical dividing lines (with consistent width) between contiguous products. The dividing lines (vertical lines of the rectangle 107) lie within a range without a product. Obviously, the product ranges 107 can also, as shown, be defined by a flat area 107, for example, rectangular as in FIG. 11e (shown as a red border) or as any envelope curve around the product 105.

As shown in FIG. 11f, ranges without product can be determined, for example, as rectangular areas, as TARE regions 109, 111, 113, 115, 117, in order to later determine a $Weight_{TARE}$, $Weight_{Total\ TARE}$, check values $K_{Region\ TARE}$ (for TARE regions), $K_{TARE}$ (for sections or product ranges) and reference values $Ref_{TARE}$.

LIST OF DRAWING REFERENCES

1 Product chain
3a-e Products
4a-e individual packages or package sections
5a-e Maxima grayscale values
7,9,11,13,15,17,19,21,23 TARE regions
25 Across TARE regions
27,29,31,33,35, 53 Actual seal seams
41,43,45,47 defined sealed seams (logical dividing lines)
51=27 Start Product chain (actual first sealed seam)
53 End Product chain (actual last sealed seam)
61 Fold
63 Film (tube)
65 Fold area (dotted line)
71 Cup chain or array of cups
73a-f Cup
75c Product
77c Circumferential edge area
79,81 TARE regions
91 Multi-chamber cups
93 Product range with product 97
96 Product range with product 999
97 Product
99 additional product
101 Bag chain
103 Individual Bag
105 Product within a bag
107 Product range
109 TARE regions (vertical) or TARE range
111 overlapping TARE regions (vertical) or TARE range
113 TARE regions (vertical) or TARE range
115 TARE regions (vertical) or TARE range
117 overlapping TARE regions (horizontal) or TARE range
A Distance between 5d and 5e
A/2 half distance for definition 41,43,45,47
B Movement direction of product chain
T diagonal, straight dividing line between ranges 93 and 95
$L_1$-$L_3$ vertical, straight dividing lines between cups 91
$W_1$,$W_2$ horizontal, straight dividing lines between columns of cups 91
$L_p$ Product chain length
$L_a$-$L_e$ defined length of package
1-1 Section line
11-11 Section line
Grayscale Value$_{Total\ Gross}$ grayscale value for the total product chain
Weight$_{Total\ Gross}$ Weight of the product chain
Weight$_{Product\ Range\ Net}$ Net weight of a product (within a product range without package or packaging material
Grayscale Value$_{Product\ Range\ Gross}$ grayscale value of a product range with product and package
Weight$_{Product\ Range\ Gross}$ Weight of a product range with product and package
Grayscale Value$_{TARE}$ grayscale value of the product range without product
Weight$_{TARE}$ Weight of a product range without product, i.e. weight of the package
Weight$_{Total\ TARE}$ TARE weight of the entire product chain
Ref$_{Gross}$ Reference value of the product chain (Ref$_{Gross}$=Weight$_{Total\ Gross}$/Grayscale Value$_{Total\ Gross}$
Weight$_{Total\ Net}$ Net weight of the product chain
Weight$_{Total\ TARE}$ Weight of the product chain without product, i.e., total weight of the packaging material of a product chain
Length$_{Product\ Range}$ Length of the product range
Length$_{Total}$ Length of the product chain
Area$_{Total}$ Area of the product chain in the x-ray image
TARE region Sub-region of the product chain without a product in it
Area$_{Region\ TARE}$ Area of the TARE region
Weight$_{Region\ TARE}$ Weight of the TARE region
Ref$_{TARE}$ Reference value of a section or Product range of an empty package (Ref$_{TARE}$=Weight$_{TARE}$/Grayscale Value$_{TARE}$)
Grayscale Value$_{Product\ Range\ Standardized}$ grayscale value of the (standardized) product range
Grayscale Value$_{Total\ Standardized}$ calculated sum of all standardized grayscale values of the product chain
$K_{Region\ TARE}$ Check value for TARE region(s)
$K_{TARE}$ Check value of the section or product range
Corr Correction value (=$K_{RegionTARE}$/$K_{TARE}$)

The invention claimed is:

1. A method for determining a net weight (Weight$_{Product\ Range\ Net}$) of a product (3a-3e) in a product range, wherein multiple connected product ranges form a product chain (1), comprising the steps of:

a) determining, with a weighing device, a total weight (Weight$_{Total\ Gross}$) of the product chain (1), b) the product chain (1) is x-rayed with an x-ray device, to determine values with one or more processors, that correspond with the x-rays, which penetrate a defined range of the product chain (1), c) determining, with one or more processors, a total value (Grayscale Value$_{Total\ Gross}$) for the entire product chain (1) from the determined values, d) selecting or specifying a product range (La-Le) with an individual product ($3a$-$3e$) contained therein is selected or specified through based on analysis of the determined values, e) forming a value (Grayscale Value$_{Product\ Range\ Gross}$) of the product range ($L_a$-$L_e$) from the determined values and either steps f) and g) or steps h) and i), f) determining, with one or more processors, a gross weight (Weight$_{Product\ Range\ Gross}$) of the product range ($L_a$-$L_e$), g) determining, with one or more processors, a net weight (Weight$_{Product\ Range\ Net}$) from the difference of the weight Weight$_{Product\ Range\ Gross}$ and a predefined or determined weight (Weight$_{TARE}$) of the product range ($L_a$-$L_e$) without product ($3a$-$3e$), or h) determining, with one or more processors, the net weight (WeightTotal Net) from the difference of the weight Weight$_{Total\ Gross}$ and a pre defined or determined weight (Weight$_{Total\ TARE}$) of the product chain (1) without product ($3a$-$3e$), and i) determining, with one or more processors, the net weight (Weight$_{Product\ Range\ Net}$) of the individual product ($3a$-$3e$) by dividing the net weight (WeightTotal Net) of the product chain (1) according to the values (Grayscale Value$_{Product\ Range\ Gross}$) of the product ranges ($L_a$-$L_e$).

2. The method according to claim 1, wherein, for the selection of the product range ($L_a$-$L_e$) a dividing line (41, 43, 45, 47) between individual, contiguous product ranges ($5a$-$5e$) or an envelope curve around an individual product ($3a$-$3e$) is determined by analyzing the determined values.

3. The method according to claim 1, wherein, j) one weight per area unit (Weight$_{TARE/L}$) of the product range ($L_a$-$L_e$) without product ($3a$-$3e$) is previously known or determined, and either steps k) or l), k) determining the weight (Weight$_{TARE}$) of the product range ($L_a$-$L_e$) without product ($3a$-$3e$) by multiplying Weight$_{TARE}$/L and area of the product range ($L_a$-$L_e$), or l) determining the weight (Weight$_{Total\ TARE}$) of the product chain (1) without product ($3a$-$3e$) is determined by multiplying Weight$_{TARE}$/L and the area of the product chain (1).

4. The method according to claim 3, wherein, the weight for each area unit (Weight$_{TARE/L}$) is determined, by pre-defining a sub-region (7, 9, 11, 13, 15, 17, 19, 21, 23, 25, 79, 81) without a product of the product chain (1) or is selected from the determined values and for this purpose the weight (Weight$_{TARE}$/L) is determined from a value (Weight$_{TARE}$).

5. The method according to claim 4, wherein, at least two sub-regions (7, 9, 11, 13, 15, 17, 19, 21, 23, 25, 79, 81) of the product chain (1) are pre-defined and the weight for each area unit (Weight$_{TARE}$/L) is determined from their average.

6. The method according to claim 1, wherein, multiple product chains (1) are processed at the same time next to each other.

7. The method according to claim 1, wherein, an array (71) of multiple lines and columns of packages ($73a$-$73f$) is processed as a product chain (1).

8. The method according to claim 1, wherein, based on the determined net weight (Weight$_{Product\ Range\ Net}$), a device for filling is monitored, controlled or regulated.

9. The method according to claim 1, wherein, the net weight (Weight$_{Product\ Range\ Net}$) is determined while the product chain (1, 71) is moving.

10. The method according to claim 1, wherein a determined value (Grayscale Value$_{Gross}$, Grayscale Value$_{TARE}$) is checked for validity against a pre-defined or determined reference value (Ref$_{Gross}$, Ref$_{TARE}$) or reference range.

11. A device for determining a net weight of a product in a product range comprising:

a scale, which is formed in such a way to determine the weight Weight$_{Total\ Gross}$ of the product chain (1) with the products ($3a$-$3e$) contained therein in each of the individual product ranges ($4a$-$4e$), an x-ray device that allows the determination of a value (Grayscale Value$_{Total\ Gross}$) for the total product chain (1), and one or more processors configured to:

a) determine values that correspond with the x-rays, which penetrate a defined range of the product chain (1), b) determine a total value (Grayscale ValueTotal Gross) for the entire product chain (1) from the determined values, c) select or specify a product range (La-Le) with an individual product ($3a$-$3e$) contained therein is based on analysis of the determined values, d) form a value (Grayscale ValueProduct Range Gross) of the product range (La-Le) is formed from the determined values and either steps e) and f) or steps g) and h), e) determine a gross weight (WeightProduct Range Gross) of the product range (LaLe), f) determine a net weight (WeightProduct Range Net) from the difference of the weight WeightProduct Range Gross and a predefined or determined weight (Weight-TARE) of the product range (La-Le) without product ($3a$-$3e$), or g) determine the net weight (WeightTotal Net) from the difference of the weight WeightTotal Gross and a pre-defined or determined weight (WeightTotal TARE) of the product chain (1) without product ($3a$-$3e$), and h) determine the net weight (WeightProduct Range Net) of the individual product ($3a$-$3e$) by dividing the net weight (WeightTotal Net) of the product chain (1) according to the values (Grayscale ValueProduct Range Gross) of the product ranges (LaLe).

12. The device according to claim 11, wherein, the x-ray device is formed in such a way that for at least one pre-defined sub-region (7, 9, 11, 13, 15, 17, 19, 21, 23, 25, 79, 81, 109) without product, a value (Grayscale Value$_{TARE}$) is determined for the product chain (1).

* * * * *

UNITED STATES PATENT AND TRADEMARK OFFICE
CERTIFICATE OF CORRECTION

PATENT NO. : 10,365,148 B2  
APPLICATION NO. : 15/309562  
DATED : July 30, 2019  
INVENTOR(S) : Peter Monz et al.

Page 1 of 2

It is certified that error appears in the above-identified patent and that said Letters Patent is hereby corrected as shown below:

On the Title Page

Column 1, Item (73), Assignee, Line 1, delete "Wipotec-Wiege-" and insert -- Wipotec Wiege- --

In the Claims

Column 19, Lines 2-3, Claim 1, after "is" delete "selected or specified through"

Column 19, Line 17, Claim 1, delete "(WeightTotal Net)" and insert -- (Weight$_{Total\ Net}$) --

Column 19, Line 18, Claim 1, delete "pre defined" and insert -- pre-defined --

Column 19, Lines 23-24, Claim 1, delete "(WeightTotal Net)" and insert -- (Weight$_{Total\ Net}$) --

Column 20, Line 25, Claim 11, delete "(Grayscale ValueTotal Gross)" and insert -- (Grayscale Value$_{Total\ Gross}$) --

Column 20, Line 32, Claim 11, delete "(Grayscale ValueProduct Range Gross)" and insert -- (Grayscale Value$_{Product\ Range\ Gross}$) --

Column 20, Lines 36-37, Claim 11, delete "(WeightProduct Range Gross)" and insert -- (Weight$_{Product\ Range\ Gross}$) --

Column 20, Line 37, Claim 11, delete "(LaLe)," and insert -- ($L_a$-$L_e$), --

Column 20, Line 38, Claim 11, delete "(WeightProduct Range Net)" and insert -- (Weight$_{Product\ Range\ Net}$) --

Column 20, Lines 39-40, Claim 11, delete "WeightProduct Range Gross" and insert -- (Weight$_{Product\ Range\ Gross}$) --

<div style="text-align: right;">
Signed and Sealed this  
Nineteenth Day of November, 2019
</div>

<div style="text-align: right;">
Andrei Iancu  
*Director of the United States Patent and Trademark Office*
</div>

CERTIFICATE OF CORRECTION (continued)
U.S. Pat. No. 10,365,148 B2

Column 20, Lines 40-41, Claim 11, delete "(WeightTARE)" and insert -- (Weight$_{TARE}$) --

Column 20, Line 43, Claim 11, delete "(WeightTotal Net)" and insert -- (Weight$_{Total\ Net}$) --

Column 20, Line 44, Claim 11, delete "(WeightTotal Gross)" and insert -- (Weight$_{Total\ Gross}$) --

Column 20, Line 45, Claim 11, delete "(WeightTotal TARE)" and insert -- (Weight$_{Total\ TARE}$) --

Column 20, Line 47, Claim 11, delete "(WeightProduct Range Net)" and insert -- (Weight$_{Product\ Range\ Net}$) --

Column 20, Line 49, Claim 11, delete "(WeightTotal Net)" and insert -- (Weight$_{Total\ Net}$) --

Column 20, Lines 50-51, Claim 11, delete "(Grayscale ValueProduct Range Gross)" and insert -- (Grayscale Value$_{Product\ Range\ Gross}$) --

Column 20, Line 51, Claim 11, delete "(LaLe)." and insert -- ($L_a$-$L_e$). --